United States Patent [19]

Barnabeo

[11] 4,374,958
[45] Feb. 22, 1983

[54] CROSSLINKABLE COMPOSITIONS BASED ON ALKYLENE-ALKYL ACRYLATE COPOLYMERS CONTAINING A POLYOL, AN ORGANO TITANATE AND A MOLECULAR SIEVE

[75] Inventor: Austin E. Barnabeo, Bridgewater, N.J.

[73] Assignee: Union Carbide Corporation, Danbury, Conn.

[21] Appl. No.: 332,274

[22] Filed: Dec. 18, 1981

[51] Int. Cl.$^3$ .............................................. C08L 33/08
[52] U.S. Cl. ................................ 525/384; 252/431 R; 428/463
[58] Field of Search .................... 525/384; 252/431 R; 523/218, 310; 524/450; 428/463

[56] References Cited

U.S. PATENT DOCUMENTS

| | | | |
|---|---|---|---|
| 3,018,264 | 1/1962 | Colclough, Jr. .................... | 523/211 |
| 3,036,980 | 5/1962 | Dunham, Jr. et al. .............. | 523/211 |
| 3,036,983 | 5/1962 | O'Connor ........................... | 523/211 |
| 3,036,984 | 5/1962 | O'Connor et al. .................. | 523/211 |
| 3,242,154 | 4/1966 | O'Connor et al. .................. | 525/342 |

Primary Examiner—Maurice J. Welsh
Attorney, Agent, or Firm—James C. Arvantes

[57] ABSTRACT

The disclosure of this application is directed to a composition based on an alkylene-alkyl acrylate copolymer, a polyhydric alcohol and an organio titanate, the cure rate of which can be retarded by the addition thereto of a molecular sieve. The composition disclosed can be extruded about wire and cables providing protective coatings thereon.

20 Claims, 4 Drawing Figures

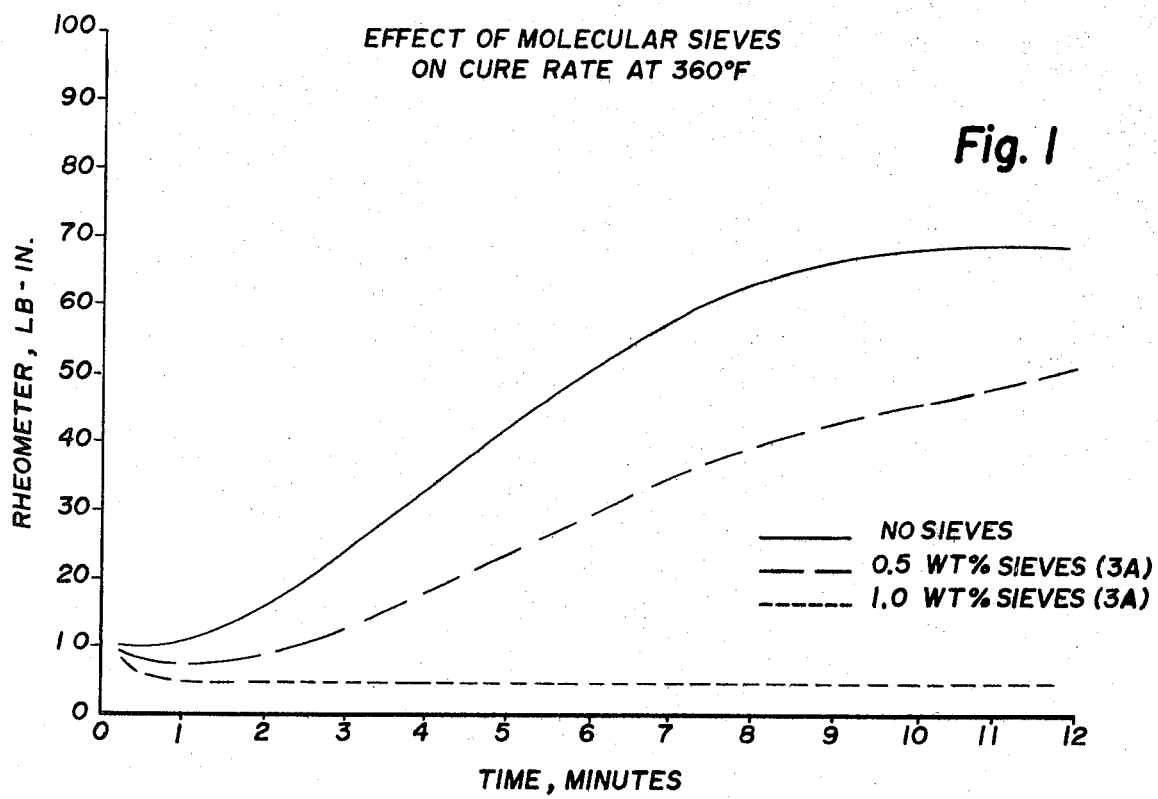
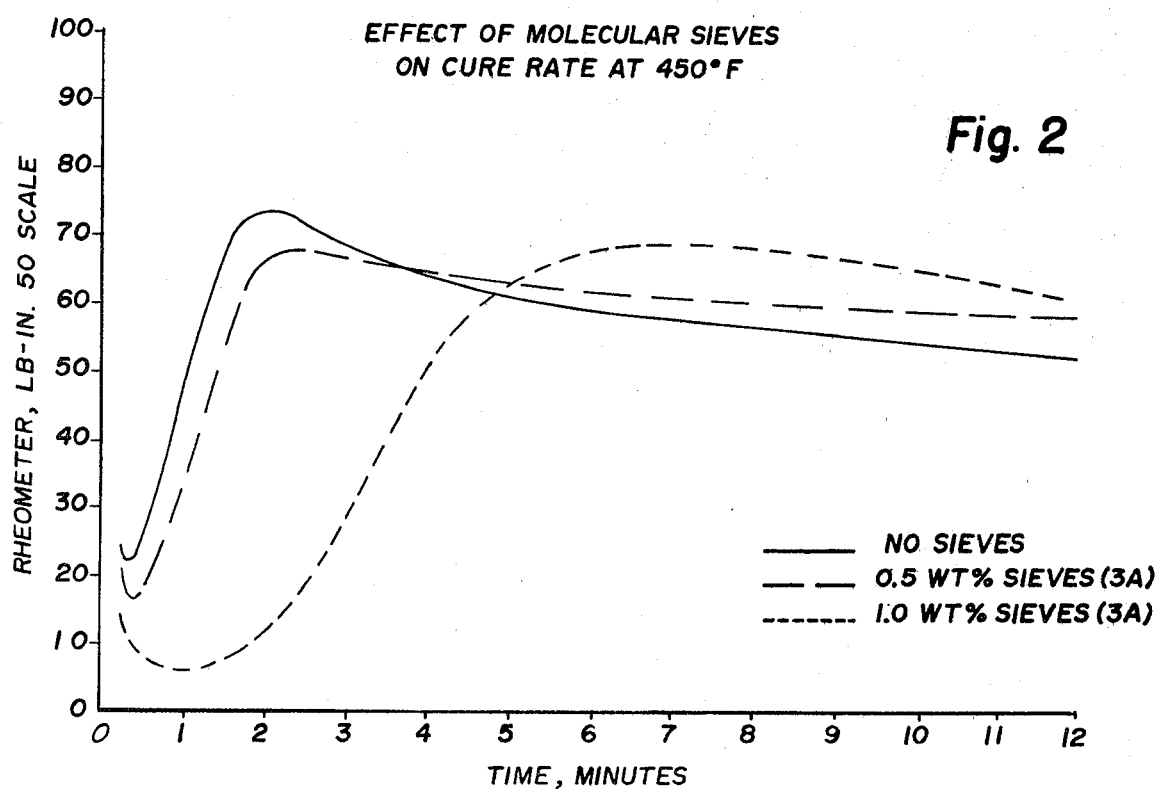

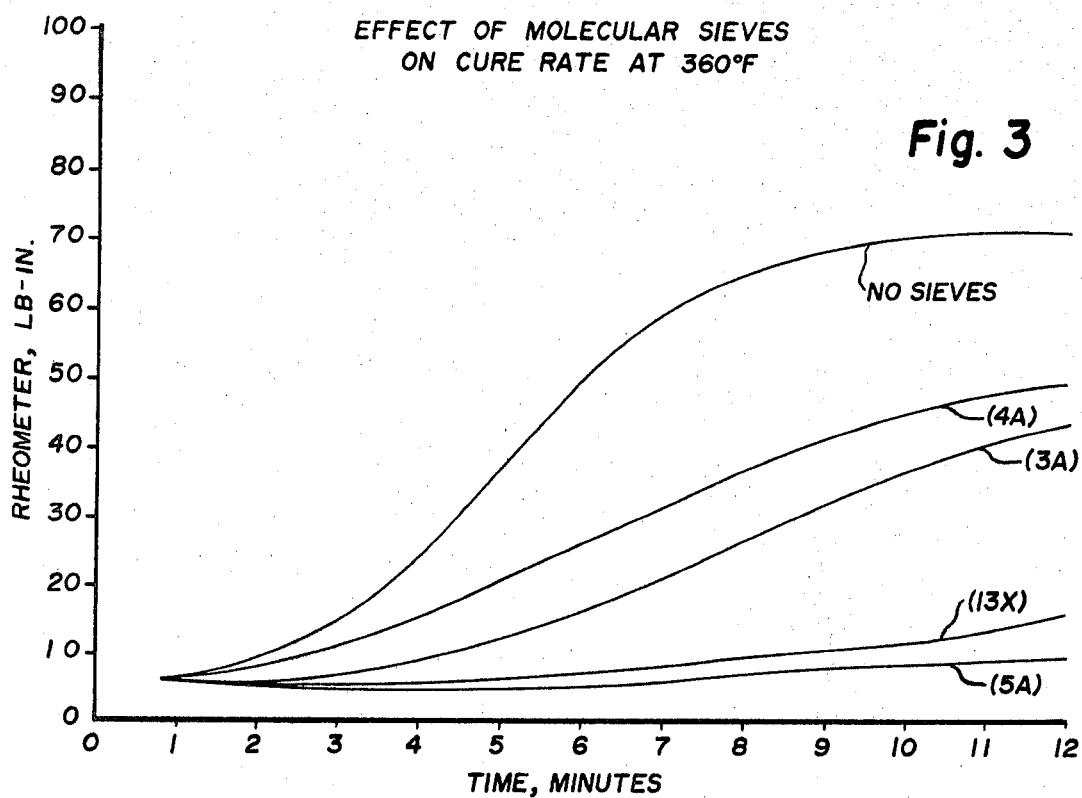
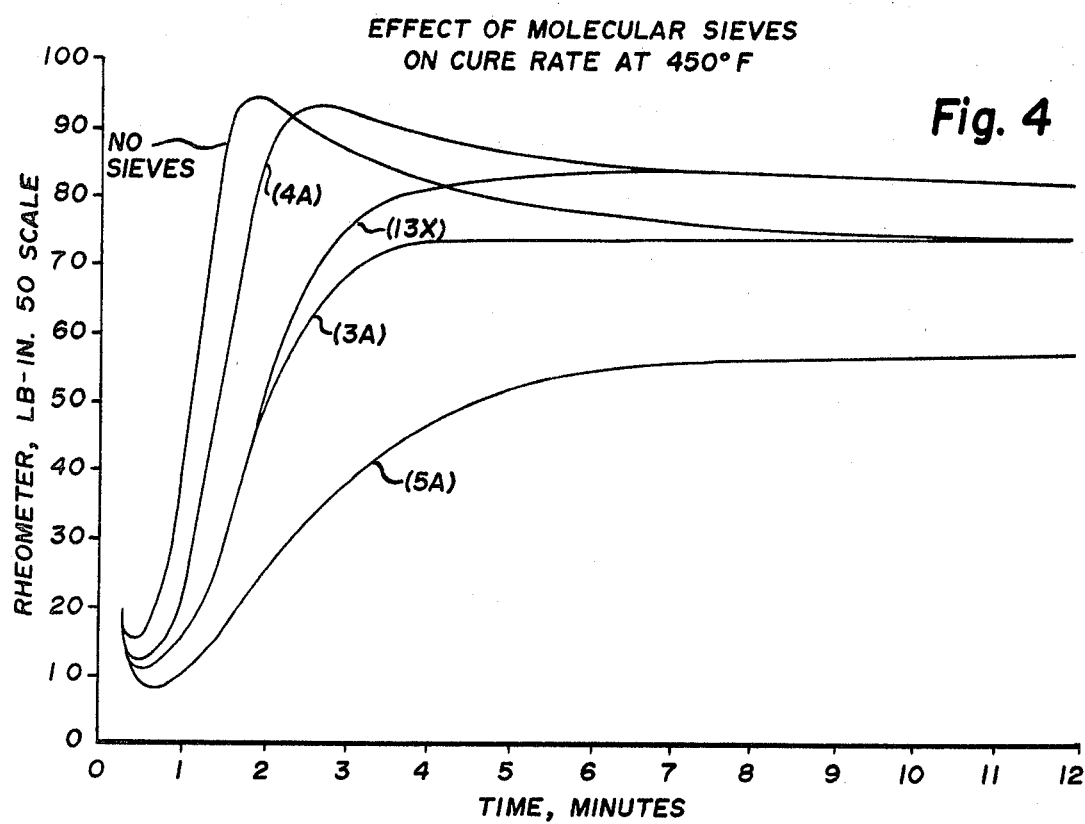

CROSSLINKABLE COMPOSITIONS BASED ON ALKYLENE-ALKYL ACRYLATE COPOLYMERS CONTAINING A POLYOL, AN ORGANO TITANATE AND A MOLECULAR SIEVE

SUMMARY OF THE INVENTION

This application relates to compositions based on an alkylene-alkyl acrylate copolymer, a crosslinking polyol and an organo titanate, the cure rates of which can be retarded by the addition thereto of a molecular sieve, allowing for extrusion of the compositions at relatively high temperatures. The compositions of this invention are particularly useful in extrusion applications, being capable of extrusion at relatively high temperatures, without crosslinking in the extruder, about electrical wires and cables and telephone wires and cables to provide protective insulation or jacketing thereon.

BACKGROUND OF THE INVENTION

Currently, protective coatings, such as insulation and jacketing, are being applied about electrical wires and cables by extruding thereon compositions containing an organic peroxide and subjecting the resultant articles to elevated temperatures in order to cure the compositions to crosslinked products. The overall operation, commonly referred to as peroxide curing, requires careful control of the process parameters in order to avoid undue heat and pressure build-up in the extruder. Undue heat and pressure build-up, results in premature decomposition of the peroxides which in turn results in crosslinking of the compositions in the extruder. Crosslinking of the compositions in the extruder, commonly referred to as "scorch" necessitates, in extreme cases, stopping the operation and cleaning the extruder.

DESCRIPTION OF THE INVENTION

The present invention provides compositions, based on alkylene-alkyl acrylate copolymers, which do not suffer the processing difficulties of peroxide curing and are particularly useful as protective extrudates, serving as insulation about electrical wires and cables and as jacketing about telephone wires and cables.

The compositions of this invention allow for wide latitude in the processing thereof in that the compositions can be extruded, without scorch, at temperatures far in excess of the maximum processing temperatures used in extruding compositions containing organic peroxides. Being capable of extrusion at relatively high temperatures, the compositions of the present invention can be extruded at faster rates and consequently, at lower overall cost, yielding protective coatings of improved surface characteristics.

The compositions of the present invention comprise an alkylene-alkyl acrylate copolymer, a crosslinking polyol, an organo titanate and a molecular sieve; wherein the polyol is present in an amount sufficient to crosslink the alkylene-alkyl acrylate copolymer to a crosslinked product, generally in an amount of about 0.1 to about 10 percent by weight; the organic titanate is present in a catalytic amount, sufficient to catalyze the crosslinking reaction between the alkylene-alkyl acrylate copolymer and the polyol, generally in an amount of about 0.1 to about 10 percent by weight; and the molecular sieve is present in an amount sufficient to retard the crosslinking reaction, generally in an amount of about 0.1 to about 5 percent by weight, preferably about 0.5 to about 1 percent by weight.

Amount by weight, unless otherwise noted, is based on the weight of the alkylene-alkyl acrylate copolymer.

The alkylene-alkyl acrylate copolymers are known copolymers produced by reacting an alkene with an alkyl acrylate. The term "acrylate" is intended to encompass acrylates as well as methacrylates, as set forth below.

Suitable alkenes are ethylene, propylene, butene-1, isobutylene, pentene-1,2-methylbutene-1,3-methylbutene-1, hexene-1, heptene-1, octene-1, and the like and mixtures thereof.

The alkylene moiety of the alkylene-alkyl acrylate copolymer generally contains from 2 to 18 carbon atoms inclusive, preferably 2 to 3 carbon atoms inclusive.

Suitable alkyl acrylate monomers which are copolymerized with the alkenes fall within the scope of the following formula:

wherein $R_1$ is hydrogen or methyl and $R_2$ is alkyl having one to 8 carbon atoms. Illustrative compounds encompassed by this formula are: methyl acrylate, ethyl acrylate, t-butyl acrylate, methyl methacrylate, n-butyl acrylate, n-butyl methacrylate, 2-ethylhexyl acrylate and the like and mixtures thereof.

Alkylene-alkyl acrylate copolymers generally have a density (ASTMD-1505 with a conditioning as in ASTMD-147-72) of about 0.92 to about 0.94 and a melt index (ASTMD-1238 at 44 psi tested pressure) of about 0.5 to about 500 decigrams per minute.

For purposes of the present invention, the preferred copolymer generally has about one to about 50 percent by weight combined alkyl acrylate, preferably about 5 to about 20 percent by weight combined alkyl acrylate.

Crosslinking polyols, for purposes of the present invention, are compounds having at least two primary hydroxyl groups attached to non-adjacent carbon atoms.

Illustrative of such polyols are the polyhydric alcohols such as the dihydric alcohols having the formula:

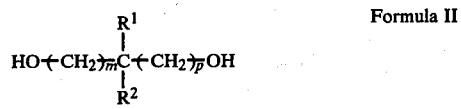

wherein the sum of m+p is at least 2, preferably 2 to 20 inclusive and $R^1$ and $R^2$ which can be the same or different, are hydrogen or alkyl and when alkyl, containing 1 to 20 carbon atoms inclusive. Specific compounds include, among others, propylene glycol, butanediol-1,4, hexanediol-1,6, decanediol-1,10, neopentyl glycol and the like.

Also suitable are the ether diols having the general formula:

wherein a has a value of at least 1, preferably 2 to 20 inclusive, and x has a value of at least 2, preferably 2 to 10 inclusive. Among compounds falling within the scope of this formula are di(ethylene glycol), di(propylene glycol) including the commercially available poly(ethylene glycol) and poly(propylene glycol).

Other suitable polyols are the cycloaliphatic polyhydric alcohols such as cyclohexanedimethanol and the like, trihydric alcohols such as glycerol and the like, the tetrahydric alcohols such as pentaerythritol and other polyols which are described in U.S. application Ser. No. 106,502 filed Dec. 26, 1979 now U.S. Pat. No. 4,351,926 granted Sept. 28, 1982 in the name of Michael J. Koegh and assigned to a common assignee, Union Carbide Corporation, the disclosure of which is incorporated herein by reference.

Suitable organo titanate compounds are characterized by the following formula:

$$Ti(OR^2)_4 \qquad \text{Formula IV}$$

wherein each $R^2$, which can be the same or different, is hydrogen or a monovalent hydrocarbon radical having one to 18 carbon atoms, preferably one to 14 carbon atoms, provided at least one $R^2$ is a monovalent hydrocarbon radical.

Exemplary of suitable hydrocarbon radicals are alkyl radicals such as methyl, ethyl, n-propyl, isopropyl, butyl, octyl, lauryl, myristyl, stearyl and the like; cycloaliphatic radicals such as cyclopentyl, cyclohexyl and the like; aryl radicals such as phenyl, methylphenyl, chlorophenyl and the like; alkaryl radicals such as benzyl and the like.

Organo titanates falling within the scope of Formula IV are known compounds and can be conveniently prepared as described in U.S. Pat. No. 2,984,641 to Leon E. Wolinsky patented May 16, 1961.

Other suitable organo titanates are the organo titanium chelates such as tetraoctylene glycol titanium, triethanol amine titanate, titanium acetyl acetonate, titanium lactate and the like.

Molecular sieves which serve to retard the crosslinking reaction, as previously explained, allowing for extrusion of the compositions at higher temperatures, are well known materials. These molecular sieves or crystalline zeolites are alumina-silica materials of the general formula:

$$M_{2/n}O.Al_2O_3.xSiO_2.YH_2O$$

wherein M is a cation having a valence of n, the water of hydration of which is removed by heating prior to use. Among basic types of molecular sieves, marketed by Union Carbide Corporation can be noted the following:

| TYPE | NOMINAL PORE DIAMETER (Å) | CATION |
|------|---------------------------|--------|
| 3A   | 3                         | K      |
| 4A   | 4                         | Na     |
| 5A   | 5                         | Ca     |
| 13X  | 10                        | Na     |

To the compositions of this invention may be added various additives, in amounts well known in the art, such as fillers among which can be mentioned carbon black, clay, talc, magnesium silicate, calcium carbonate, silica, aluminum hydroxide and the like, antioxidants such as 1,2-dihydro-2,3,4-trimethylquinoline and the like.

The compositions can be rendered flame retardant by the addition thereto of halogen containing flame retardants such as decabromodiphenyloxide, chlorinated polyethylene, polyvinyl chloride and halogenated paraffin waxes, along, or in admixture with organic or inorganic antimony compounds such as antimony oxide and/or alkaline earth metal oxides, carbonates, hydroxides and sulfates. Among such alkaline earth metal compounds can be noted calcium oxide, calcium carbonate, calcium hydroxide, calcium sulfate, magnesium oxide, magnesium carbonate, magnesium hydroxide and magnesium sulfate.

It is to be noted that mixtures of reactants, catalysts, sieves and the like can be used if so desired.

Formulation of the compositions of this invention can be carried out by mixing the components thereof in a suitable mixer such as a Brabender mixer, at elevated temperatures on the order of about 100° C. to about 130° C. until a blend is obtained. A suitable procedure is described in reference to the examples which follow. These examples are illustrative of the present invention and are not intended to limit the scope thereof in any manner.

The curing or crosslinking of the compositions is effected by heating the compositions at elevated temperatures on the order of about 380° F. to about 800° F., preferably temperatures on the order of about 450° F. to about 600° F.

Actually, it is preferred to carry out the crosslinking as the last step in the overall extrusion operation wherein the composition is extruded about a wire or cable and the extruded product, once out of the extruder is subjected to the temperatures previously noted while in an inert gas atmosphere.

In order to demonstrate the desirable characteristics of the compositions of this invention, a number of compositions, formulated as described below, were prepared, formed into plaques and subjected to the Monsanto Rheometer test.

The Monsanto Rheometer test is fully described in U.S. Pat. No. 4,017,852 granted Apr. 19, 1977, the disclosure of which is incorporated herein by reference. Briefly, FIG. 1 of this patent shows the typical Monsanto Rheometer curve. The cure level (highest crosslink density) is designated as H. It is measured in terms of inch-pounds or torque on the Rheometer test equipment. A higher value for H corresponds to a higher crosslink density.

EXAMPLE 1

A. 94.14 grams of an ethylene-ethyl acrylate copolymer having a melt index of 1.6 and containing about 15 percent by weight combined ethyl acrylate and 0.7 grams of 1,2-dihydro-2,3,4-tetramethylquinoline were placed in a Brabender mixer, which was operating at 40 rpm and a temperature of 110° C., and fluxed for four minutes. At the end of the four minute period, 1.0 gram of molecular sieve, Type 3A was added to the Brabender and mixing continued for another five minutes. 1.8 grams of 1,4-cyclohexanedimethanol were than added to the Brabender mixer and mixing continued for another four minutes. At the end of this second four minute period, 2.36 grams of tetraisopropyl titanate were added to the Brabender mixer and mixing continued for another four minutes. The composition was then removed from the Brabender and molded into discs having dimensions of 3 inches by 8 inches by 0.075 inch, in a press, under the following conditions:

|  | INITIAL |  | FINAL |
|---|---|---|---|
| Pressure | = 200 psi |  | 5000 psi |
|  |  | Followed |  |
| Temperature | = 130° C. | by | 130° C. |
| Time Cycle | = 7 minutes |  | 3 minutes |

Plaques were then used in the Monsanto Rheometer test to obtain a graph in which Rheometer readings in inch-pounds were plotted against time in minutes.

B. Plaques were prepared and tested as described in 1A from a composition, as described in 1B, with the exception that the Type 3A molecular sieve content was 0.5 gram and the ethylene-ethyl acrylate copolymer content was 94.64 grams.

Control 1 Plaques were prepared and tested as described in 1A from a composition, as described in 1A with the exception that the composition did not contain molecular sieves and the ethylene-ethyl acrylate copolymer content was 95.14.

Graphs, obtained on testing each composition at temperatures of 360° F. and at 450° F., were superimposed as depicted in FIGS. I and II.

FIGS. I and II show graphically, that at a temperature of 360° F., the cure speed of the composition was drastically reduced by the presence of molecular sieves; while at a temperature of 450° F., the cure speed of compositions containing molecular sieves was almost comparable to a composition which did not contain molecular sieves.

EXAMPLE 2

The composition of this example was prepared as described in Example 1A using the materials of Example 1 in the following amounts:

Ethylene-ethyl acrylate copolymer=95.0 grams
1,2-dihydro-2,3,4-tetramethylquinoline=0.7 gram
Type 3A molecular sieve=1 gram
1,4-cyclohexanedimethanol=1.8 grams
Tetraisopropyl titanate=1.5 gram Plaques were prepared from this composition, in a manner as described in Example 1A and the plaques subjected to the Monsanto Rheometer test.

At a temperature of 360° F., no discernable crosslinking took place. The Rheometer reading was 4.

At a temperature of 450° F., a significant increase in the Rheometer level and rate of reaction was observed. The Rheometer reading was about 35.

Compositions, the formulations of which are described below, were prepared and formed into plaques, as described in Example 1A. Plaques were tested according to the Monsanto Rheometer test at the temperatures indicated, graphs obtained and the graphs superimposed as shown in FIGS. III and IV.

EXAMPLE 3

Ethylene-ethyl acrylate copolymer composition—96.7 grams
Type 3A molecular sieve—1.0 gram
1,4-cyclohexanedimethanol—1.8 grams
Tetraisopropyl titanate—1.5 grams

EXAMPLE 4

Ethylene-ethyl acrylate copolymer composition—96.7 grams
Type 4A molecular sieve—1.0 gram
1,4-cyclohexanedimethanol—1.8 grams
Tetraisopropyl titanate—1.5 grams

EXAMPLE 5

Ethylene-ethyl acrylate copolymer composition—96.7 grams
Type 5A molecular sieve—1.0 gram
1,4-cyclohexanedimethanol—1.8 grams
Tetraisopropyl titanate—1.5 grams

EXAMPLE 6

Ethylene-ethyl acrylate copolymer composition—96.7 grams
Type 13X molecular sieve—1.0 gram
1,4-cyclohexanedimethanol—1.8 grams
Tetraisopropyl titanate—1.5 grams

CONTROL

Ethylene-ethyl acrylate copolymer composition—96.7 grams
1,4-cyclohexanedimethanol—1.8 grams
Tetraisopropyl titanate—1.5 grams The formulation of the ethylene-ethyl acrylate copolymer composition of Examples 1-6 and the Control was as follows:

|  | Parts by Weight |
|---|---|
| Ethylene-ethyl acrylate copolymer containing 15 percent by weight combined ethyl acrylate Melt Index 1.3 | 56 |
| Talc coated with zinc stearate | 21.8 |
| Antimony oxide | 2.5 |
| Calcium carbonate | 2.5 |
| Ethylene(bis-tetrabromophthalimide)(flame retardant) | 16.4 |
| 1,2-di-hydro-2,3,4-trimethylquinoline(anti-oxidant) | 0.6 |
| Vinyl-tris(2-methoxyethoxy)silane | 0.2 |

What is claimed is:

1. A crosslinkable composition comprising an alkylene-alkyl acrylate copolymer, a primary, polyhydric alcohol wherein primary hydroxyl groups are attached to non-adjacent carbon atoms in an amount sufficient to crosslink said copolymer, an organo titanate in an amount sufficient to catalyze the crosslinking reaction between the primary, polyhydric alcohol and the alkylene-alkyl acrylate copolymer and a molecular sieve in an amount sufficient to retard the crosslinking reaction.

2. A crosslinkable composition comprising an alkylene-alkyl acrylate copolymer, a primary, polyhydric alcohol wherein primary hydroxyl groups are attached to non-adjacent carbon atoms in an amount of about 0.1 to about 10 percent by weight, an organo titanate in an amount of about 0.1 to about 10 percent by weight and a molecular sieve in an amount of about 0.1 to about 5 percent by weight, wherein amounts are based on the weight of said copolymer.

3. A composition as defined in claim 1 wherein the molecular sieves is present in an amount of about 0.5 to about 1 percent by weight.

4. A composition as defined in claim 1 wherein the said copolymer is an ethylene-ethyl acrylate copolymer.

5. A composition as defined in claim 1 wherein the organo titanate is tetraisopropyl titanate.

6. A composition as defined in claim 1 wherein the polyhydric alcohol is 1,4-cyclohexanedimethanol.

7. A composition as defined in claim 1 wherein the molecular sieve has a pore size of 3Å.

8. A composition as defined in claim 1 wherein the molecular sieve has a pore size of 4Å.

9. A composition as defined in claim 1 wherein the molecular sieve has a pore size of 5Å.

10. A composition as defined in claim 1 wherein the molecular sieve has a pore size of 10Å.

11. A composition as defined in claim 1 wherein the organo titanate has the formula:

$$Ti(OR^2)_4$$

wherein each $R^2$ is hydrogen or a monovalent hydrocarbon radical having 1 to 18 carbon atoms provided that at least one $R^2$ is a monovalent hydrocarbon radical.

12. The crosslinked product of the composition defined in claim 1.

13. An electrical wire or cable having as a protective coating thereon the composition or the cured product of the composition defined in claim 1.

14. A process of retarding the crosslinking of a composition containing an alkylene-alkyl acrylate copolymer, a primary, polyhydric alcohol and an organo titanate which comprises adding thereto a molecular sieve in an amount of about 0.1 to about 5 percent by weight based on the weight of the said alkylene-alkyl acrylate copolymer.

15. A process as defined in claim 14 wherein the molecular sieve is added in an amount of about 0.5 to about 1 percent by weight.

16. A crosslinkable coposition comprising an alkylene-alkyl acrylate copolymer, a crosslinking polyol, in an amount sufficient to crosslink said copolymer, an organo titanate in an amount sufficient to catalyze the crosslinking reaction between said polyol and said copolymer and a molecular sieve in an amount sufficient to retard the crosslinking reaction.

17. An additive, suitable for crosslinking an alkylene-alkyl acrylate copolymer at elevated temperatures, comprising a polyol capable of crosslinking an alkylene-alkyl acrylate copolymer, an organo titanate catalyst and a molecular sieve.

18. An additive as defined in claim 17 wherein the polyol is 1,4-cyclohexanediol.

19. An additive as defined in claim 17 wherein the organo titanate is tetraisopropyl titanate.

20. An additive as defined in claim 17 wherein the polyol is 1,4-cyclohexanediol and the organo titanate is tetraisopropyl titanate.

* * * * *